United States Patent [19]

Mally et al.

[11] Patent Number: 4,526,505
[45] Date of Patent: Jul. 2, 1985

[54] FAST RETRACT FEED

[75] Inventors: Timothy G. Mally, Oregon; Bruce W. Stengel, De Forest, both of Wis.

[73] Assignee: Oscar Mayer Foods Corporation, Madison, Wis.

[21] Appl. No.: 463,561

[22] Filed: Feb. 3, 1983

[51] Int. Cl.³ .............................................. B65G 25/08
[52] U.S. Cl. ..................... 414/750; 414/224; 414/18; 198/485; 198/747; 198/748; 83/278; 226/112; 226/162
[58] Field of Search .............. 414/749, 750, 222, 18, 414/19; 198/485, 747, 748, 750; 83/278; 226/162, 112

[56] References Cited

U.S. PATENT DOCUMENTS

| 543,914 | 8/1895 | Watson et al. | 226/112 X |
|---|---|---|---|
| 3,146,879 | 9/1964 | Montagino | 198/747 |
| 3,741,374 | 6/1973 | Hufford | 198/747 X |
| 4,018,328 | 4/1977 | Galarowic et al. | 198/747 X |
| 4,119,254 | 10/1978 | Lorenz | 226/162 X |

Primary Examiner—Terrance L. Siemens
Attorney, Agent, or Firm—J. T. Harcarik; T. R. Savoie; D. J. Donovan

[57] ABSTRACT

An apparatus and method are provided for feeding elongated products, such as feeding large sausage chubs or loafs to a slicer, which apparatus includes a transport for engaging such elongated products during the feed mode. At the end of the feeding mode, the transport is disengaged from its feed mechanism and is rapidly retracted by a drive assembly to a location for re-engagement with the transport feed assembly. The transport drive assembly may include dual drive members such as ball screws and ball screw nuts which are synchronized such that as one ball screw nut moves toward the front of the apparatus, the other moves toward the rear of the apparatus.

17 Claims, 9 Drawing Figures

FIG_5_

FIG_6_

FIG. 7

FAST RETRACT FEED

BACKGROUND AND DESCRIPTION OF THE INVENTION

This invention generally relates to an apparatus and method for feeding elongated products, more particularly to feeding a plurality of elongated products in a series through a selected stroke length in order to pass the elongated products to a subsequent treatment station. The invention is particularly well suited for feeding food products such as sausage chubs or loafs through an automatic slicer. The length of time between feeding strokes is minimized by disengaging the feed transport assembly from its drive mechanism at the end of the feed stroke and then subjecting the transport assembly to a fast retract operation whereby the transport assembly returns to its feed initiating position whereat it re-engages its drive mechanism.

High volume production of products such as sliced sausages includes passing large elongated sausage chubs and loafs through a high speed slicer, after which stacks of slices that are of a selected weight are packaged as a processed meat product suitable for wide distribution for eventual sale to the retail customer as a conveniently packaged product. In devices of this type, where production volume is an important consideration, it is desirable to minimize the time that it takes to feed and slice the elongated products. While the feed time is generally limited by the speed and capacity of the slicer, shortening the length of time needed for any return strokes is a viable manner of reducing total processing times.

Previously devloped sausage feeding and slicing mechanisms include multiple feed drive assemblies which move product engaging members simultaneously in opposite directions so that one product engaging member is returning to the feed initiating position while the other is feeding an elongated product to a slicing assembly, which mechanisms permit a plurality of elongated products to be fed in succession to the slicing assembly. One aspect of this type of apparatus is that the returning feed mechanism traverses its return path by reversing the direction of the feed mechanism and the product engaging carriage attached thereto. Because the carriage is returned to the feed initiating position by reversing the drive means, the speed of the return stroke is limited by the reverse speed of the drive mechanism. Also, running the drive mechanism at full speed in the reverse direction under the load of the carriage tends to shorten the life of the feed mechanism. For example, a maximum return speed for a ball screw and ball nut mechanism that is typically utilized in these type of devices is about nine inches per second. Since a typical commercial sausage slicing apparatus has a feed length of about six feet, a return stroke of this type will require approximately eight seconds.

There is accordingly a need for a sausage slicer feed mechanism that is capable of handling commercial volumes, that has a minimum retract time, and that avoids a return stroke that incorporates full implementation of the feed mechanism in reverse direction. Such is accomplished by the present invention which includes a feed assembly that is readily engaged and disengaged from a transport assembly by an actuator assembly. When the apparatus is thus disengaged, a retract drive assembly rapidly retracts the transport assembly from its feed-completed position to its feed-initiating position for re-engagement of the feed assembly with the transport assembly.

It is accordingly a general object of the present invention to provide an apparatus and method for feeding elongated products in a series through a selected stroke length.

Another object of this invention is to provide an improved apparatus and method for precisely feeding a series of elongated products through a slicing assembly, which includes retracting the feed transport at a rapid speed while same is disengaged from the transport feed mechanism.

Another object of the present invention is to provide an improved apparatus and method for slicing an elongated sausage with maximum efficiency by precisely feeding the sausage to and through a high speed slicer by the action of a driven transport assembly, which transport assembly is disengaged from its feed mechanism after slicing is completed, at which time the transport is rapidly retracted by a retract drive assembly.

Another object of the present invention is to provide an improved apparatus and method for feeding elongated products through a selected stroke length which includes means for retracting the product engaging member in about one second or less through a feed length of about six feet.

These and other objects of the present invention will become apparent from the following detailed description of this invention, taken in conjunction with the accompanying drawings, wherein:

Figure 1:
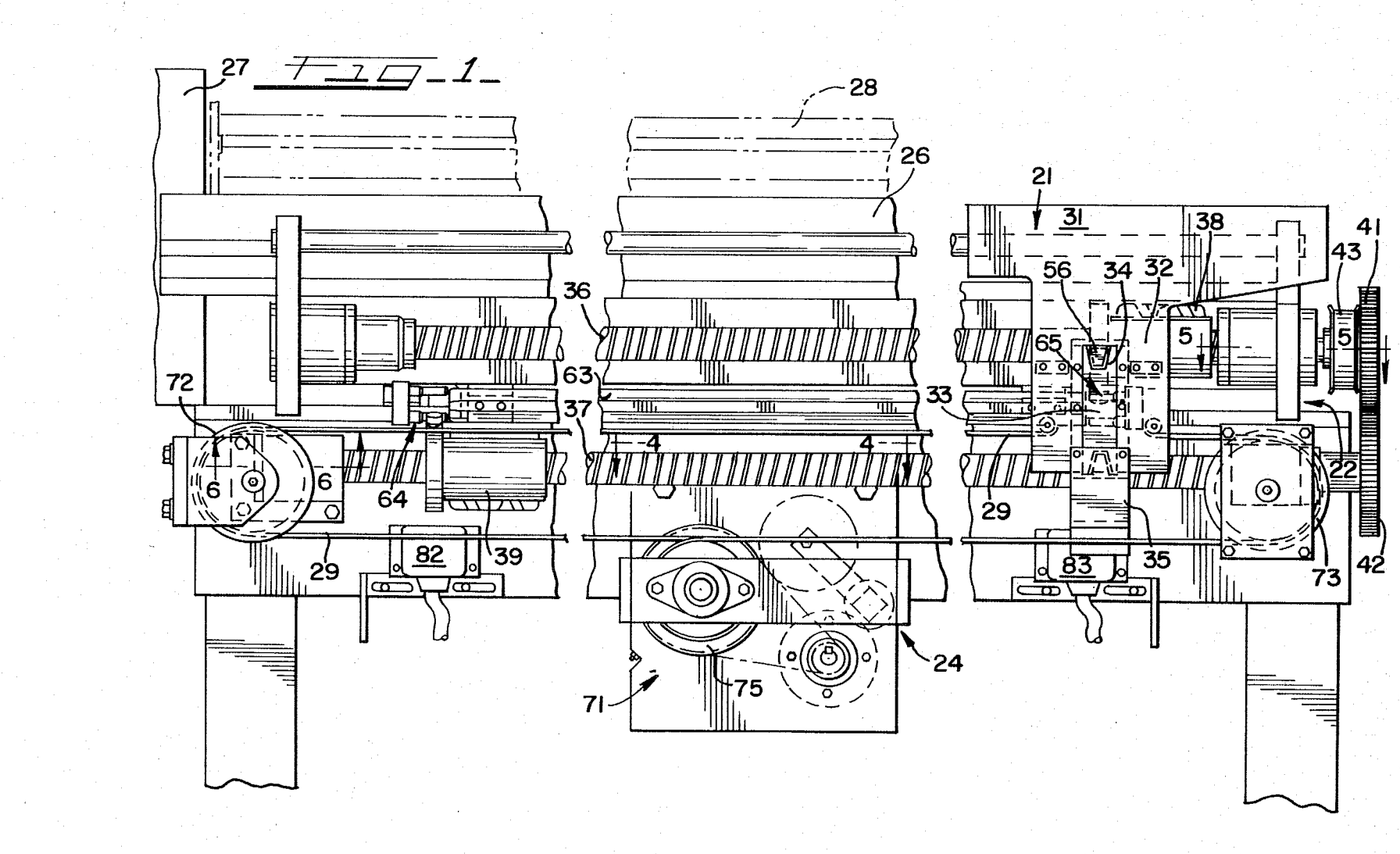
FIG. 1 is a side elevational view, partially broken away, of the fast retract feed apparatus in accordance with this invention.

Referring to FIG. 1, the apparatus of this invention includes a transport assembly generally designated as 21, a feed assembly generally designated as 22, an actuator assembly generally designated as 23, and a retract drive assembly illustrated generally at 24. In use, an elongated product 25 (FIG. 2) such as a sausage is fed into an elongated product support channel 26 which extends to a subsequent treatment station such as a slicing assembly 27. The transport assembly 21 feeds the product 25 within the support channel 26 to the slicing assembly 27 to thereby form product slices in a conventional manner. An elongated product feed magazine (not shown) located above the support channel 26 is capable of holding a plurality of elongated products 25 and provides such products 25 in a controlled manner to the elongated product support channel 26 after such channel 26 has been emptied.

While an elongated product 25 is being fed to and through the slicing assembly 27, the transport assembly 21 is in feeding engagement with the feed assembly 22. After feeding has been completed, such engagement is terminated by operation of the actuator assembly 23, which occurs when the transport assembly 21 is at the front or feed-completed end of the feed assembly 22, typically near the end of the apparatus having the slicing assembly 27. Once such disengagement has occurred, the retract drive assembly 24, which includes a cable 29 or the like that is secured to the transport assembly 21, rapidly retracts the disengaged transport assembly 21 from its front or feed-completed position to a rear or feed-initiating end of the feed assembly 22, typically near the end of the apparatus that is opposite the slicing assembly 27. Once such fast retract step has been completed, the actuator assembly 23 effects re-engagement of the feed assembly 22 with the transport assembly 21.

Figure 3:
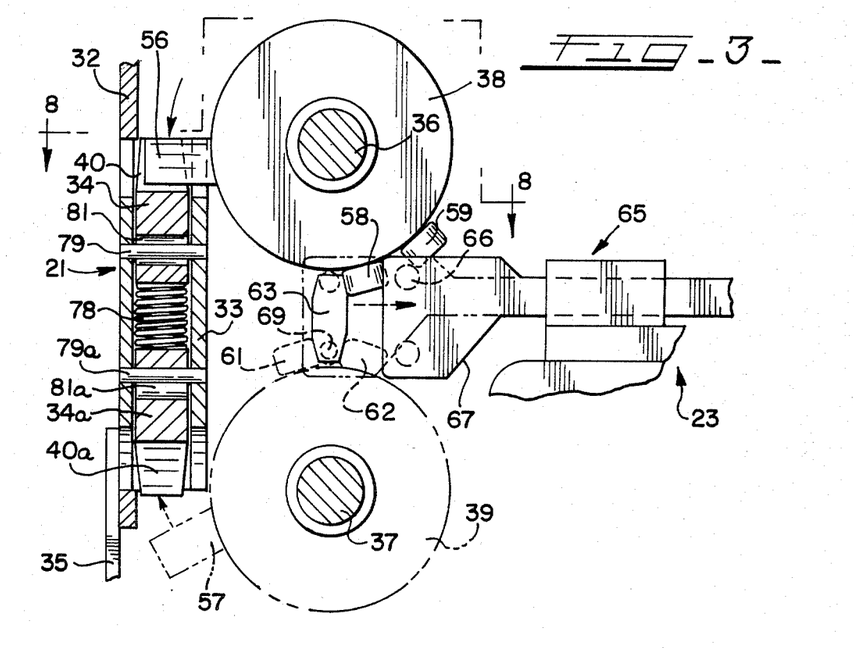
FIG. 3 is an enlarged detail view of the actuator assembly for engaging and disengaging the transport assembly from the transport feed assembly.
Figure 7:
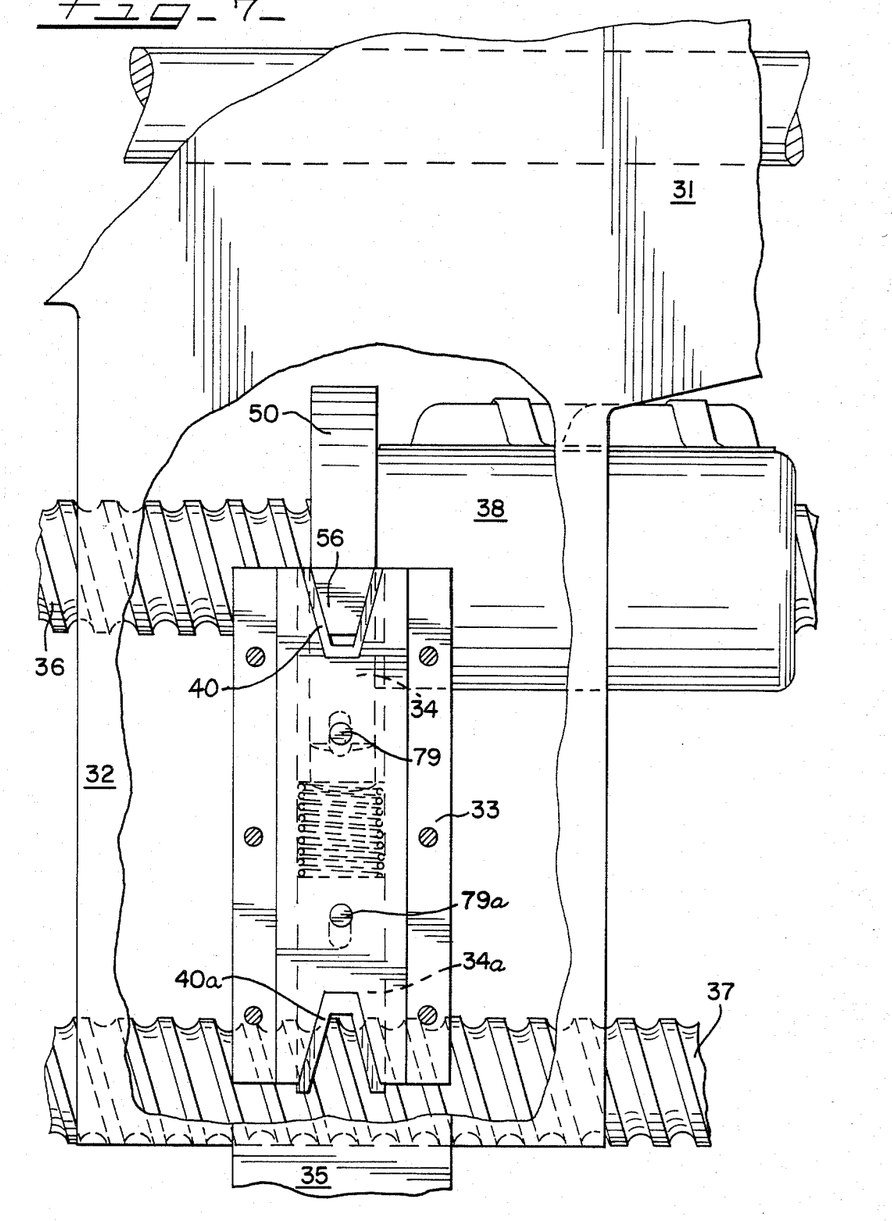
FIG. 7 is a partially broken away side elevational view of the transport engaging and disengaging mechanism.
Figure 9:
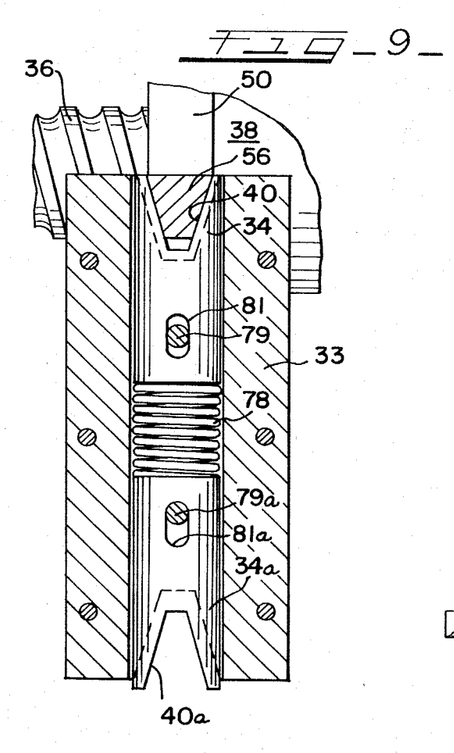
FIG. 9 is a sectional view along the line 9—9 of FIG. 8 illustrating engagement between an engagement block of the transport assembly and an engagement lug of the transport feed assembly.

Transport assembly 21 includes a pusher member 31 for engaging the product 25, which product engagement may include grasping members such as hooks for securing the product 25 while it is being fed. Transport assembly 21 further includes a carriage member 32, to which is affixed a floating guide carriage mount 33 having transport engagement blocks or stop blocks 34, 34a for selectively receiving an element of the feed assembly 22. Usually, as illustrated in FIGS. 3, 7 and 9, these stop blocks 34, 34a include indents 40, 40a, preferably of a generally V-shaped configuration.

Feed assembly 22 includes elongated drive members and driven members which traverse a path therealong. In the illustrated embodiment, the drive members are upper ball screw 36 and lower ball screw 37 and their respective associated driven members are upper ball nut 38 and lower ball nut 39. Alternative drive and driven member assemblies include long stroke hydraulic cylinders and appropriate elements driven thereby.

Figure 5:
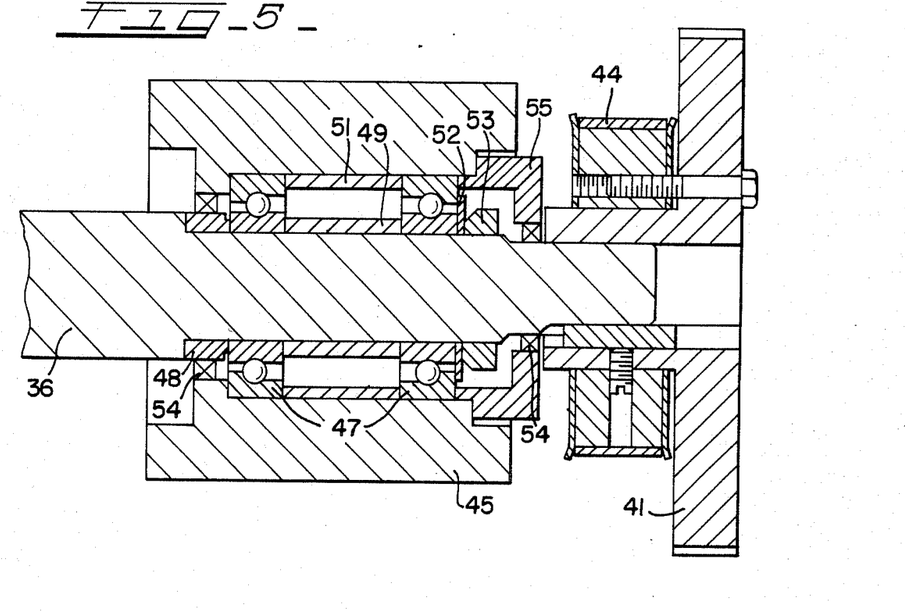
FIG. 5 is a sectional view along the line 5—5 of FIG. 1, illustrating the rear end mount of the upper ball screw portion of the feed assembly.
Figure 6:
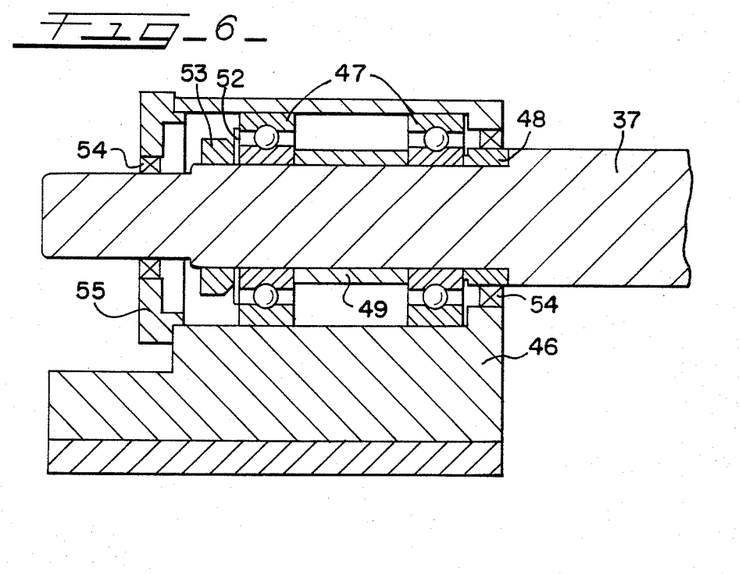
FIG. 6 is a sectional view along the line 6—6 of FIG. 1, illustrating the front end mount of the lower ball screw of the feed assembly.

Ball screws 36 and 37 are appropriately mounted (FIGS. 5 and 6) for rotation by the spur gears 41 and 42, which spur gears mesh with each other in order to drive one of the ball screws in a clockwise direction while the other ball screw is simultaneously rotated in a counterclockwise direction. A mechanism such as a DC servo drive motor 43 drives the feed assembly 22 by means of belt 44 or the like. The ball screw 36 is secured to the apparatus by a suitable rear mount 45 and front mount 46 including bearings 47, seal spacers 48, pre-load spacers 49 and 51, lock washers 52, lock nuts 53, seals 54 and bearing caps 55.

Figure 8:
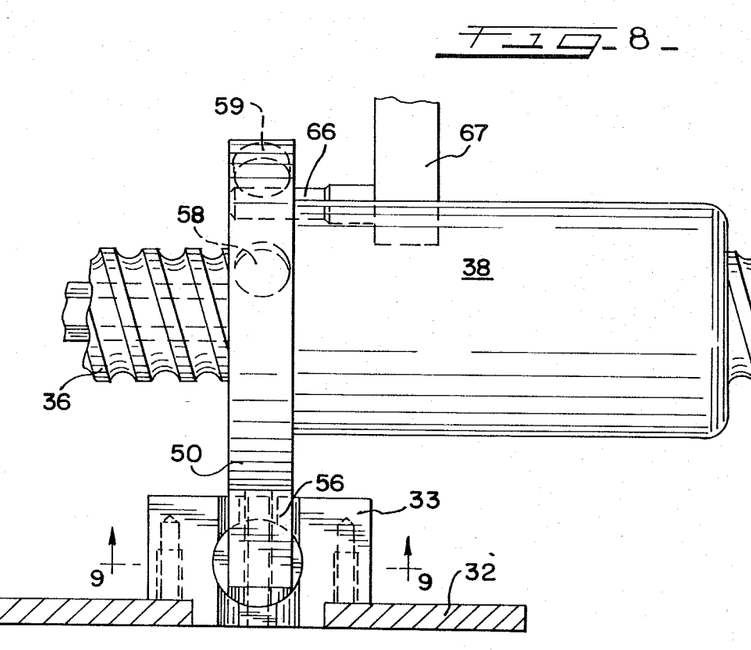
FIG. 8 is a top plan view along the line 8—8 of FIG. 3, further illustrating the transport engaging and disengaging mechanism.

With more particular reference to the ball nuts 38 and 39, each includes a projecting block or lug 56 and 57, each of which extends radially and outwardly from its respective ball nut 38 or 39, typically, as shown in FIG. 8, in association with a rotatably acting finger 50 secured to the ball nut 38 or 39. Also radially projecting from ball nut 38 are a pair of spaced apart cam followers or stops 58 and 59, each said stop 58 and 59 being spaced from the lug 56. Spaced cam followers or stops 61 and 62 are similarly radially extending and spaced from the lug 57 on the ball nut 39.

The lugs 56 and 57 of the feed assembly 22 cooperate with the transport assembly stop blocks 34 to thereby engage and disengage the transport assembly 21 from the feed assembly 22. When the stop blocks 34 and 34a are generally V-shaped indents as illustrated, the lugs 56 and 57 are generally V-shaped detents as shown. Such engagement and disengagement is effected by the operation of the actuator assembly 23 on the cam followers or stops 58, 59, 60 and 62 at appropriately timed sequences. By this structure, the feed assembly 22 includes a ball screw and ball nut assembly that operates to effect the feeding of the apparatus while also providing the structure utilized to engage and disengage the transport assembly 21 from the feed assembly 22.

Feed assembly 22 further includes a cam rail 63 along which the cam followers or stops 58, 59, 61 and 62 may ride while the ball nuts 38 and 39 move between the front portion and the rear portion of the apparatus. Cam rail 63 is of such a length that the stops or cam followers 58, 59, 61 and 62 clear the cam rail 63 when the respective ball nuts 38 and 39 are at their terminal positions, that is at their feed-initiating positions and at their feed-completed positions. When the stops or cam followers 58, 59, 61 and 62 are thus clear of the cam rail 63, the actuator assembly 23 is free to selectively shift in order to rotate a ball nut 38 or 39 such that its respective lug 56 or 57 is rotated into engagement or disengagement with stop block 34 or 34a of the transport assembly 21.

With particular reference to FIG. 3, the upper ball nut 38 is illustrated in its feeding orientation; that is, the lug 56 is in engagement with the stop block 34 of the transport assembly 21 and, in the preferred embodiment illustrated, both of the stops or cam followers 59 are on one side of the cam rail 63. As the upper ball screw 36 is rotated by the operation of the motor 43, the upper ball nut 38 rotates with respect to the ball screw 36 whereby the ball nut 38 traverses a path from near the rear end of the apparatus toward the slicing assembly 27.

At the same time, the spur gear 41 rotates the spur gear 42 to thereby rotate the lower ball screw 37 in a direction opposite to the rotational direction of the upper ball screw 36. At the orientation illustrated in FIG. 3, the lug 57 is disengaged from the stop block 34 of the transport assembly 21, and the lower ball nut 39 is traversing a path from near the front end of the apparatus toward the rear end of the apparatus. In order to better control the rotation of the ball nut 39 with respect to the ball screw 37 as the ball nut 39 is moving in this direction from the front to the rear, the cam followers or stops, 61, 62 straddle the cam rail 63. Such straddling prevents the ball nut 39 from uncontrolled rotation by maintaining the angular attitude of the ball nut 39 with respect to the transport assembly 21 and the cam rail 63.

When the lower ball nut 39 has reached its feed-initiating position, its angular orientation is shifted by the actuator assembly 23, and it then moves from near the rear of the apparatus toward the front end of the apparatus, or toward the slicing assembly 27, at which time the lug 57 is in engagement with the stop block 34 of the transport assembly 21, and both of the stops or cam followers 61 and 62 may be on the same side of the cam rail 63. Simultaneously, the upper ball nut 38 is moving in the direction away from the slicing assembly 27 and toward the rear end of the apparatus, during which time the lug 56 is disengaged from the stop block 34 of the transfer assembly 21, and the stops or cam followers 58 and 59 generally straddle the cam rail 63.

Referring more particularly to the change in orientation of the angular attitude of the ball nuts 38 and 39 by the actuator assembly 23, such typically takes place at the feed-completed position and at the feed-initiating position. Actuator assembly 23 includes a front shifter assembly 64 closely spaced from the front edge of the cam rail 63 and a rear shifter assembly 65 closely spaced from the rear edge of the cam rail 63. With further reference to the orientation illustrated in FIG. 3, such orientation was effected by the operation of the rear shifter assembly 65 on the stop or cam follower 59 of the upper ball nut 38. More specifically, a shifter pin 66 of a push arm 67 contacts an interior edge of the stop 59, and the push arm 67 is moved away from the ball nut 38 by the action of an air cylinder 68 or the like until the ball nut 38 is approximately in the orientation as illustrated in FIG. 3. This is the feed orientation.

Rear shifter assembly 65 operates on the lower ball nut 39 in substantially the same manner as it operates on the upper ball nut 38. Such is illustrated in phantom in FIG. 3. Lower shifter pin 69 engages stop or cam follower 62, the air cylinder 68 moves the push arm 67 in a direction away from the transport assembly 21 until the stop or cam follower 61 clears the rear end of the cam rail 63. When this shifting operation is completed, the lower ball nut 39 has an orientation generally similar to that illustrated in FIG. 3 for the upper ball nut 38; that is, the projecting lug 57 engages the stop block 34a of the transport assembly 21, and both of the stops or cam followers 61 and 62 are on the same side of the cam rail 63.

The operation of the front shifter assembly 64 is similar to that of the rear shifter assembly 65, except, in the embodiment as illustrated, the front shifter assembly 64 shifts the ball nuts 38, 39 from their feed orientation to their return orientation. More particularly, a shifter pin similar to shifter pin 66 will engage a stop or cam follower of the upper ball nut 38 in order to move the upper ball nut 38 from its feed orientation wherein the lug 56 engages the upper stop block 34 of the transport assembly 21, and to its return orientation wherein the lug 56 is out of engagement with the stop block 34. At this orientation, the stops or cam followers 58 and 59 are positioned such that they will straddle the cam rail 63 when the ball nut 38 traverses a path along the cam rail 63. This front shifter assembly 64 effects a similar shifting of the lower ball nut 39 when same is at the feed-completed position near the front of the apparatus by shifting same from the feed orientation wherein the lug 57 engages the lower stop block 34a to the return orientation when same are out of engagement.

In other words, the shifter assemblies 64 and 65 switch the lugs 56 and 57 which engage the transport assembly 21 at the ends of travel of the ball nuts 38 and 39. The rear shifter assembly 65 shifts one of the ball nuts 38 or 39 into engagement with the transport assembly 21, while the front shifter assembly 64 shifts the other of the ball nuts 38 or 39 out of engagement with the transport assembly 21.

After the ball nut 38 or 39 that has been in engagement with the transport assembly 21 is disengaged therefrom by operation of the front shifter assembly 64, the transport assembly 21 is free of any engagement with the feed assembly 22. At this time, it is then possible for the retract drive assembly 24 to rapidly retract the transport assembly 21 from the feed-completed position near the front end of the apparatus to the feed-initiating position near the rear end of the apparatus, which is in general alignment with the rear shifter assembly 65.

Figure 2:
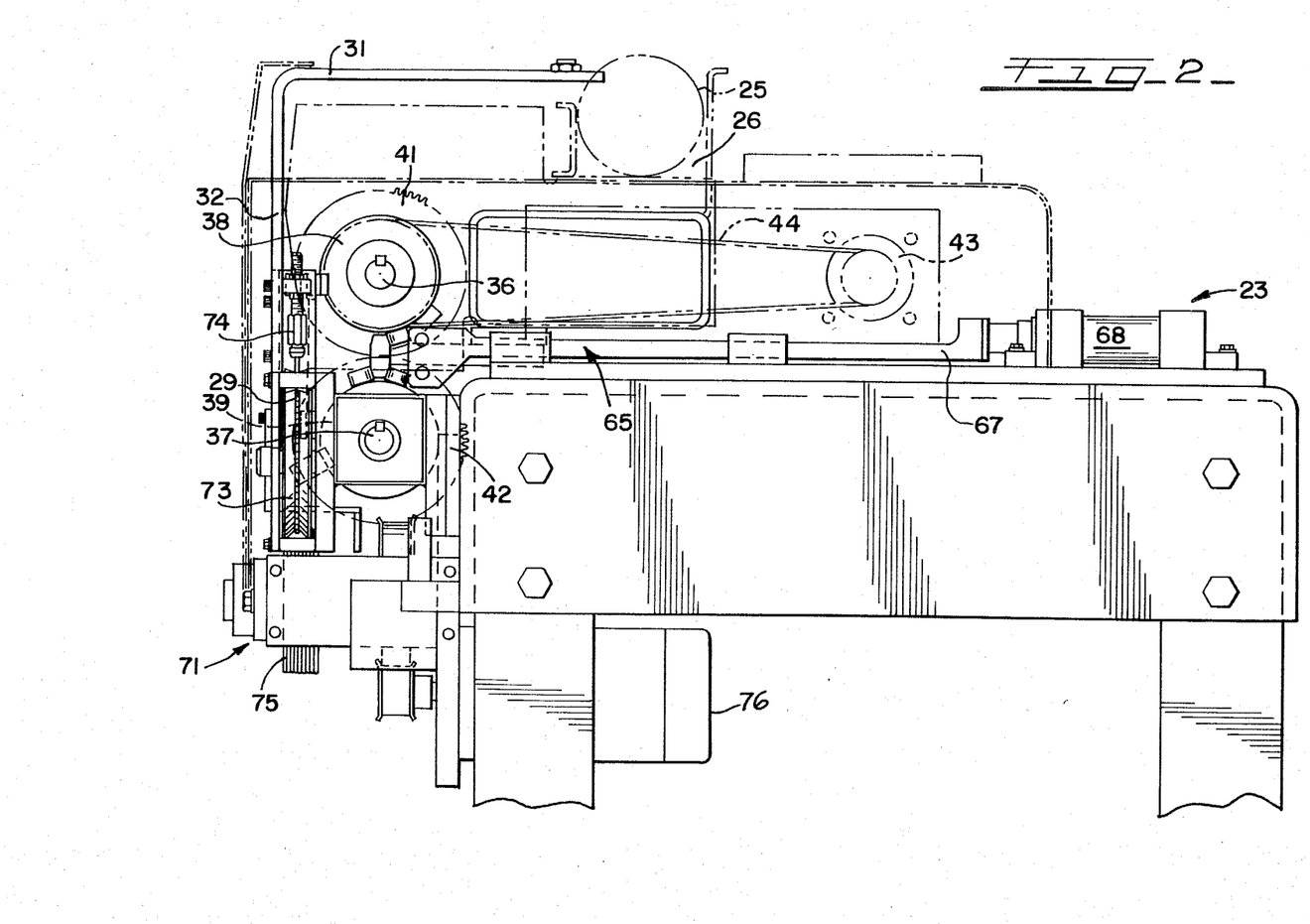
FIG. 2 is an elevational view of the rear or feed end of the apparatus of FIG. 1.
Figure 4:
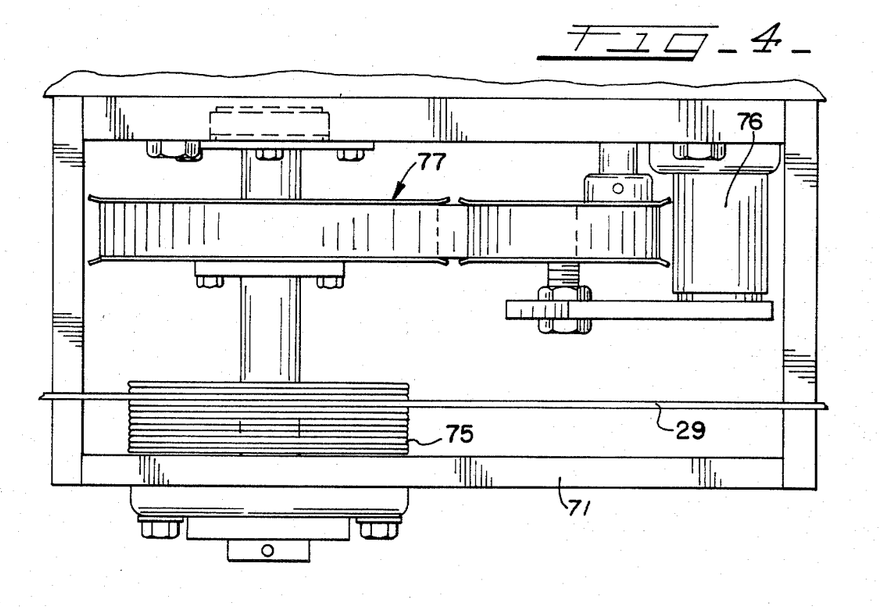
FIG. 4 is a plan view along the line 4—4 of FIG. 1 illustrating a portion of the transport retract drive assembly.

Retract drive assembly 24 includes the wire rope or cable 29, a drive sub-assembly 71, a front idler pulley 72, and a rear idler pulley 73. The cable 29 is securely affixed to the transport assembly 21 by suitable securement means such as a machine stud assembly 74 (FIG. 2). In addition to being secured to the transport assembly 21 and being in rotating engagement with the idler pulleys 72 and 73, the cable 29 is coiled around a suitable drive member such as the multi-grooved shive 75 as illustrated in FIG. 4. A drive device such as DC servo motor 76 provides the work needed to actuate the retract drive assembly 24. Motor 76 drives the shive 75 through suitable conventional mechanisms such as the belt and pulley assembly 77 illustrated, which may include idling and tensioning capabilities.

While the feed assembly 22 is moving the transport assembly 21 toward the slicing assembly 27, the motor 76 is shut off, that is no power is transmitted to same, with the result that the transport assembly 21 moves the idler pulleys 72, 73 counterclockwise and the shive 75 in the clockwise direction as illustrated in FIG. 1. Once the transport assembly 21 reaches its forward or feed-completed position and the front shifter assembly 64 disengages the feed assembly 22 from the transport assembly 21, power is applied to the motor 76 in order to accomplish the fast retract operation, which includes rotating the shive 75 in the counterclockwise direction as illustrated in FIG. 1, which in turn rotates the idler pulleys 72, 73 in the clockwise direction and moves the transport assembly 21 to the rear or feed-initiating position of the apparatus. Preferably, the drive sub-assembly 71 has the capacity to "ramp" whereby the transport assembly 21 gradually brakes in order to avoid imparting unnecessary impact forces to the rear portion of the apparatus when the transport assembly 21 reaches its feed-initiating position.

Preferably, the stop blocks 34 and 34a are spring loaded within their floating guide carriage mount 33 that is secured to the carriage member 32. For example, as shown, a coil spring 78 is positioned between the stop blocks 34 and 34a, which stop blocks are in turn secured in sliding relationship with the carriage mount 33 by means of dowel pins 79, 79a and slots 81, 81a. An actuator plate 35 may depend from the carriage member 32 as illustrated for actuation of limit switches 82, 83 positioned along the feed path of the apparatus.

Limit switches 82, 83, and others, are contacted by the limit switch actuator plate 35 as the transport assembly 21 traverses its path along and beyond the cam rail 63. These limit switches and other signal receiving and transmitting members signal various movements to particular members of the apparatus.

These various members signal several of the steps of the method, including when the elongated product 25 has been fed forwardly to a desired point, at which time the front shifter assembly 64 will shift the ball nut that was in the feed orientation or mode to its return orientation or mode. Another member may signal when this shifting has been completed, after which a signal will be given to actuate the motor 76 of the retract drive assembly 24 in order to move the transport assembly 21 rearwardly. Additional members may be provided to signal when braking thereof is to be initiated by ramping the motor 76. Further devices may be provided to read that the transport assembly 21 has returned to its rearmost position and that the stops or cam followers of the ball nuts are beyond the rear edge of the cam rail 63, which signals that the rear shifter assembly 65 may be activated in order to shift the appropriate ball nut to its drive orientation or mode, further indicating when this step has been completed. Another mechanism may be provided to feed another elongated product 25 from the magazine to indicate that the product 25 has been delivered to the support channel 26 and is in position for initiating the feeding operation. The feeding operation is initiated and proceeds until the appropriate mechanism is tripped indicating that feeding has proceeded to the extent desired, which completes the cycle.

Inasmuch as this invention can be embodied in various forms, it is to be construed and limited only by the scope of the appended claims.

What is claimed is:

1. An apparatus for precisely feeding an elongated product through a selected feeding stroke, comprising:
 a transport assembly slidingly mounted on the apparatus for longitudinal movement along a transport path for moving an elongated product in a longitudinal direction, said transport assembly having an engagement block;
 a feed assembly having a drive member and a driven member that traverses a drive path along the drive member, said drive path having a feed-initiating position and a feed-completed position, said driven member having a lug that is structured for engagement with said engagement block of the transport assembly;
 an actuator assembly for engaging a portion of the feed assembly, said actuator assembly effecting engagement or disengagement of the feed assembly with respect to the transport assembly at the feed-initiating position and feed-completed position of the feed assembly, said actuator assembly including shifter means for shifting the feed assembly between a feed orientation and a return orientation of the driven member; and
 a retract drive assembly for rapidly moving said transport assembly along said transport path when said transport assembly is disengaged from said feed assembly.

2. The apparatus of claim 1, wherein said engagement block of the transport assembly includes an indent having a generally V-shaped configuration.

3. The apparatus of claim 1, wherein said transport assembly includes means for imparting a bias to the engagement block when said lug of the driven member is in engagement therewith.

4. The apparatus of claim 1, wherein said feed assembly includes a plurality of drive members and driven members and means for activating said drive members to move said driven members in opposite directions.

5. The apparatus of claim 1, wherein said lug of the driven member rotatably engages said engagement block of the transport assembly.

6. The apparatus of claim 1, wherein said feed assembly includes a longitudinal cam rail, and said driven member of the feed assembly includes a cam follower spaced from said lug of the driven member, said cam follower being spaced for selected engagement with and movement generally along said cam rail.

7. The apparatus of claim 1, wherein said feed assembly includes a longitudinal cam rail, and said driven member of the feed assembly includes a plurality of cam followers spaced from said lug of the driven member, said cam followers being spaced from each other at a distance that allows said cam followers to straddle the cam rail and move generally therealong.

8. The apparatus of claim 1, wherein said lug of the driven member is a detent having a generally V-shaped configuration.

9. The apparatus of claim 1, wherein said feed assembly includes a longitudinal cam rail that extends between and has a length not greater than the distance between said feed-initiating position and said feed-completed position.

10. The apparatus of claim 1, wherein said drive path of the feed assembly is generally coterminous with said transport path of the transport assembly.

11. The apparatus of claim 1, wherein said shifter means of the actuator assembly includes means for moving said lug of the driven member into engagement and disengagement with said engagement block of the transport assembly.

12. The apparatus of claim 1, wherein said actuator assembly includes a rear shifter assembly for moving said lug of the driven member into engagement with said engagement block of the transport assembly, and said actuator assembly further includes a front shifter assembly for moving said lug of the driven member out of engagement with said engagement block of the transport assembly.

13. The apparatus of claim 1, wherein said retract drive assembly moves the transport assembly from its feed-completed position to its feed-initiating position.

14. The apparatus of claim 1, wherein said retract drive assembly includes means securely affixed to said transport assembly for imparting a driving force to the transport assembly, said driving force being imparted to said securely affixed means by a drive subassembly.

15. The apparatus of claim 1, wherein said feed assembly includes a plurality of drive members and driven members and means for activating said drive members to move said driven members in opposite directions, said transport assembly has a plurality of lug-receiving members, said lug of each of the driven members rotatably engages one of said lug-receiving members, said feed assembly includes a longitudinal cam rail, and each of said driven members includes a cam follower spaced from said lug of such driven member and oriented for movement generally along said cam rail.

16. The apparatus of claim 1, wherein said feed assembly includes a longitudinal cam rail that extends between and has a length not greater than the distance between said feed-initiating position and said feed-completed position, said actuator assembly includes a rear shifter assembly for moving said lug of the driven member into engagement with said engagement block of the transport assembly, and said actuator assembly further includes a front shifter assembly for moving said lug of the driven member out of engagement with said engagement block of the transport assembly, said rear shifter assembly moves said lug of the driven member when said lug is clear of the cam rail at said feed-initiating position, and said front shifter assembly moves said lug of the driven member when said lug is clear of the cam rail at said feed-completed position.

17. The apparatus of claim 1, wherein said feed assembly includes a plurality of drive members and driven members and means for activating said drive members to move said driven members in opposite directions, and said retract drive assembly moves the transport assembly from its feed-completed position to its feed-initiating position.

* * * * *